US012431261B2

(12) United States Patent
Ice et al.

(10) Patent No.: US 12,431,261 B2
(45) Date of Patent: Sep. 30, 2025

(54) REFLECTIVE POWER LINES

(71) Applicants: Jordan Ice, Greensburg, IN (US); Dereck Moore, Holton, IN (US)

(72) Inventors: Jordan Ice, Greensburg, IN (US); Dereck Moore, Holton, IN (US)

( * ) Notice: Subject to any disclaimer, the term of this patent is extended or adjusted under 35 U.S.C. 154(b) by 203 days.

(21) Appl. No.: 18/218,417

(22) Filed: Jul. 5, 2023

(65) Prior Publication Data

US 2025/0014781 A1 Jan. 9, 2025

(51) Int. Cl.
*H01B 9/00* (2006.01)
*H01B 5/08* (2006.01)
*H01B 13/34* (2006.01)

(52) U.S. Cl.
CPC .................................... *H01B 9/008* (2013.01)

(58) Field of Classification Search
CPC ......... H01B 5/08; H01B 13/342; H01B 9/008
See application file for complete search history.

(56) References Cited

U.S. PATENT DOCUMENTS

| | | | | |
|---|---|---|---|---|
| 5,286,922 A * | 2/1994 | Curtiss | H01B 5/008 256/10 |
| 7,228,627 B1 * | 6/2007 | Yoshimura | H01B 5/104 174/128.1 |
| 2015/0170797 A1 * | 6/2015 | Perez-Sanchez | H01B 7/1855 174/113 R |
| 2018/0248348 A1 * | 8/2018 | Kamiyama | A01M 29/08 |

FOREIGN PATENT DOCUMENTS

JP 11168822 A * 6/1999

* cited by examiner

*Primary Examiner* — Timothy J Thompson
*Assistant Examiner* — Amol H Patel
(74) *Attorney, Agent, or Firm* — Lyman Moulton, Esq.; Moulton Patents, PLLC

(57) ABSTRACT

The Glo Wire is the only product of its kind that integrates aluminum conductor steel reinforced (ASCR) with a reflective wire to enhance safety and efficiency when working on electrical operations. This unprecedented product is uniquely designed with durable, high-quality materials to ensure long-term sustainability and was created by professional electrical engineers.

19 Claims, 4 Drawing Sheets

REFLECTIVE POWER LINES

BACKGROUND

The majority of power linemen and other utility workers tend to conduct assessment at night, where wires run through dense forest/trees and/or during power outages. Working these electrical lines in low light environments, minimum wire access and/or evening hours can be incredibly tedious, time-consuming, and hazardous. There have been no products available as original equipment or as an aftermarket to address this problem.

An apparatus that would create a safer, and more efficient way of working with power lines in low light environments is not being met by any known device or system at present. There have been no products available as original equipment or as an aftermarket to address this problem either.

SUMMARY OF THE INVENTION

The main purpose of the reflective power lines is to provide users with a reflective woven wire or cable to support electrical work and assessment.

A bare power line comprising a wire strand comprising the bare power line, the wire strand comprising a circumference and a length, a reflective coating stripe on the wire strand of a width proportional to its circumference; and a non-reflective portion of the wire. Multiple wire strands comprising the reflective coating stripe make up power line cables as disclosed and claimed herein.

DETAILED DESCRIPTION

Figure 1:
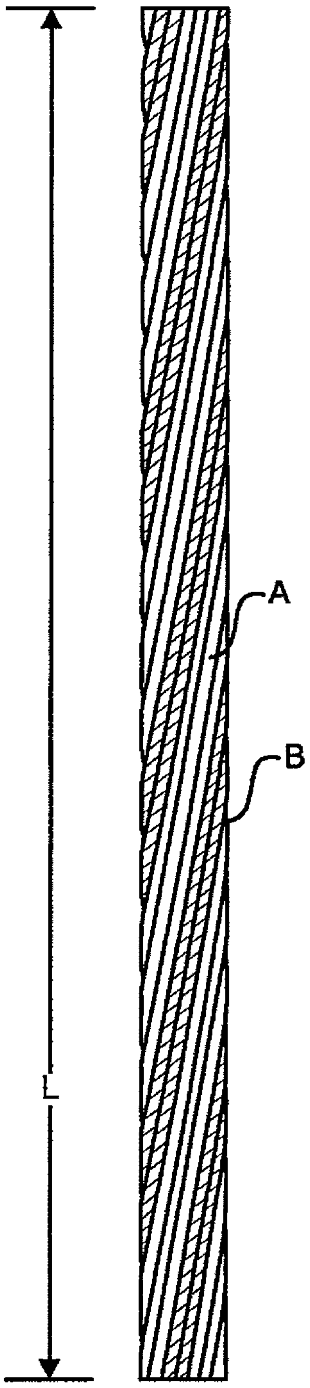
FIG. 1 is a front elevational view of the reflective power line in accordance with an embodiment of the present disclosure.

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

The term 'strand' used throughout the present disclosure refers to component wires making up the power line and include single wire power lines, stranded wire power lines and cable power lines. Single wire strand power lines comprise straight wires and twisted wires. The term 'woven,' therefore refers to a helical structure and relation as well as to a twisted structure and relation of multiple wire strands.

FIG. 1 is a front elevational view of the reflective power line showing: aluminum conductor steel reinforced (ACSR) bare cable woven of 6 aluminum and 1 steel core referenced as A, 2 strands of aluminum with a reflective wire strand referenced as B, in accordance with an embodiment of the present disclosure. The length L of the reflective coating power line depicts a stripe length and a twist length of the reflective coating on the strand(s) of wire.

Figure 2:
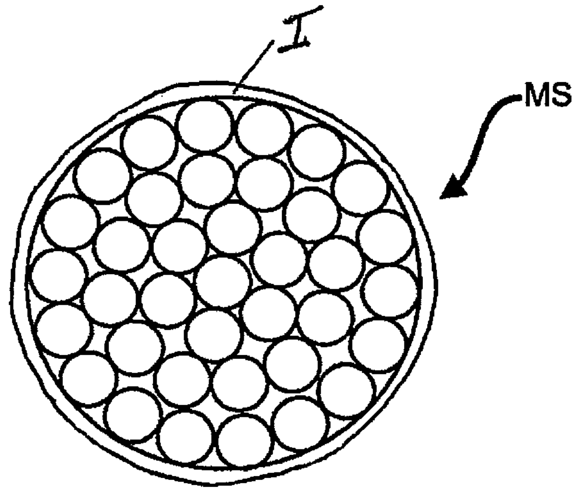
FIG. 2 is a cross section of a multiple strand reflective coating power line in accordance with an embodiment of the present disclosure.

FIG. 2 is a cross section of a multiple strand reflective coating power line in accordance with an embodiment of the present disclosure. The multiple reflective coating wire strand MS power line depicted has a single core and 16 outer strands and an insulating cover I over the entire surface of the multiple strand reflective coating power line otherwise a bare power line. The insulating cover I on the bare power line comprises a reflective coating portion and a non-reflective portion. The insulating cover I on the bare power line comprising a reflective coating portion on all the insulating cover I. Embodiments include the insulating cover I on the bare power line comprising a reflective coating stripe helical on a full length of the insulating cover. The insulating cover on the bare power line also comprises a reflective coating stripe straight on a full length of the insulating cover.

Figure 3:
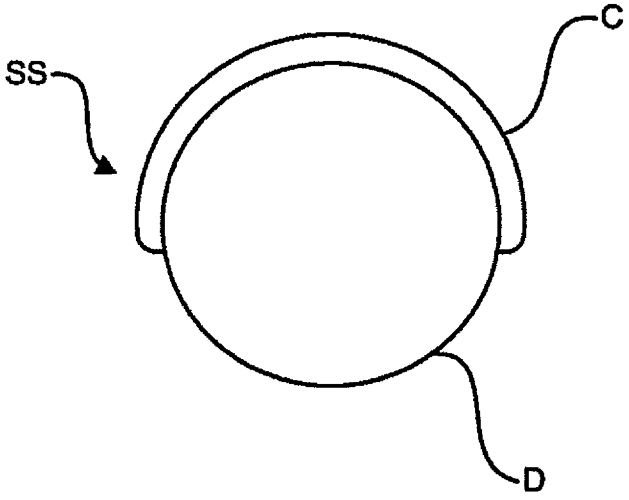
FIG. 3 is a cross section of a single strand reflective coating power line in accordance with an embodiment of the present disclosure.

FIG. 3 is a cross section of a single strand reflective coating power line in accordance with an embodiment of the present disclosure. The single reflective coating wire strand SS depicts a reflective coating C and a non-reflective portion D. The reflective coating C covers a portion of the circumference of the cross section and the non-reflective coating is non-polished and conductive to electrical current from adjacent strands or other neighboring wires in a cable or a circuit.

The present disclosed reflective power lines, also known as "GloWire", offers a modern wire design that serves to increase safety and efficiency in the maintenance of electrical and steel wire infrastructure to allow for improved operation. The Glo Wire introduces one to three novel woven reflective wires that are integrated into the electrical wires overhead. When users shine a light from a work-truck and/or review the wire from a far distance, the wire reflects from their light source. This visual distinction permits linemen and other workers to easily identify whether the wires are up or down, even in low light conditions; thus, reducing outage time and potential hazards often associated with electrical maintenance. Moreover, extending the use of reflective wires to other types of steel wire infrastructure, such as highway dividers, could also benefit road safety. This innovative, top-quality product would dramatically save on outage time and power correction, as well as make a lineman's job easier and more efficient.

Figure 4:
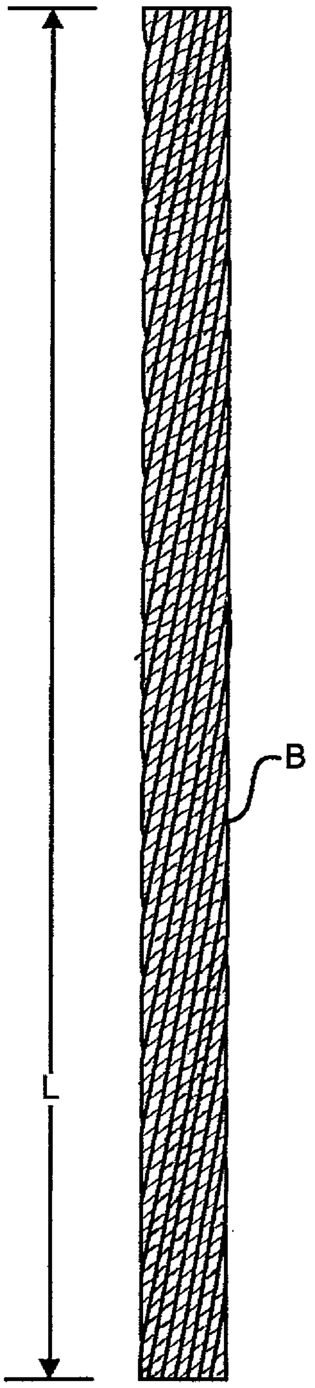
FIG. 4 is another front elevational view of the reflective power line in accordance with an embodiment of the present disclosure. Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

FIG. 4 is another front elevational view of the reflective power line in accordance with an embodiment of the present disclosure. There are no non-reflective strands or portions in this embodiment for all wire strands are reflective. All wire strands have a reflective coating stripe B. The entire exposed surface and area of the bare power line are reflective coated over the entire exposed length L. A first reflective coating stripe on a first wire strand reflects visible light and a second reflective coating stripe on a second wire strand reflects a non-visible portion of an electromagnetic wave spectrum. Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A bare power line comprising:

an exposed surface;

a wire strand comprising the bare power line, the wire strand comprising a circumference and a length; and a reflective coating stripe on the wire strand of a width proportional to its circumference, wherein a first reflective coating stripe on a first wire strand reflects visible light and a second reflective coating stripe on a second wire strand reflects a non-visible portion of an electromagnetic wave spectrum.

2. The bare power line of claim 1, wherein the reflective coating stripe is straight on the length of the wire.

3. The bare power line of claim 1, wherein the reflective coating stripe is helical on the length of the wire.

4. The bare power line of claim 1, wherein the reflective coating stripe width is less than one half the circumference.

5. The bare power line of claim 1, wherein the reflective coating stripe width is greater than one half its circumference.

6. The bare power line of claim 1, wherein a stripe distance required to complete one revolution of the reflective coating stripe around the circumference is less than one meter.

7. The bare power line of claim 1, wherein a stripe distance required to complete one revolution of the reflective coating stripe around the circumference is greater than one meter.

8. The bare power line of claim 1, further comprising a plurality of reflective coating stripe wire strands comprising all the bare power line.

9. The bare power line of claim 1, further comprising a plurality of non-reflective wire strands comprising the bare power line.

10. The bare power line of claim 1, wherein a stripe distance of the reflective coating stripe equals a twist length of a plurality of wire strands comprising the bare power line.

11. The bare power line of claim 1, further comprising a plurality of the wire strands equal to 6 aluminum and at least one steel central core.

12. The bare power line of claim 1, further comprising a woven plurality of the wire strands greater than 6.

13. The bare power line of claim 1, further comprising a woven plurality of the wire strands less than 6.

14. The bare power line of claim 1, wherein the reflective coating stripe is a highly polished portion of the wire strand in relation to a non-reflective portion.

15. The bare power line of claim 1, wherein the reflective coating stripe comprises all of the exposed surface of the bare power line.

16. The bare power line of claim 1, further comprising an insulating cover on the bare power line comprising a reflective coating portion and a non-reflective portion.

17. The bare power line of claim 1, further comprising an insulating cover on the bare power line comprising a reflective coating portion on all the insulating cover.

18. The bare power line of claim 1, further comprising an insulating cover on the bare power line comprising a reflective coating stripe helical on a full length of the insulating cover.

19. The bare power line of claim 1, further comprising an insulating cover on the bare power line comprising a reflective coating stripe straight on a full length of the insulating cover.

* * * * *